July 20, 1965  W. SCHOCH ETAL  3,196,038
PROCESS AND APPARATUS FOR THE PRODUCTION
OF COATED PAPER AND THE LIKE
Filed Oct. 12, 1960  3 Sheets-Sheet 1
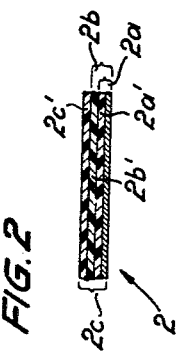
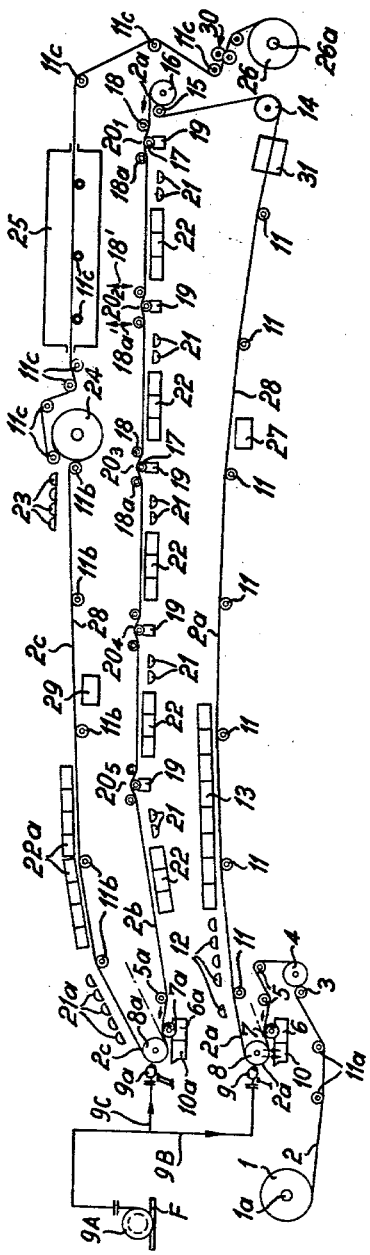
INVENTORS
Walter SCHOCH, Hans Georg DEUTSCHER
Siegfried HIRSCH, Heinz WEISS.
By
Michael S. Striker
their Attorney

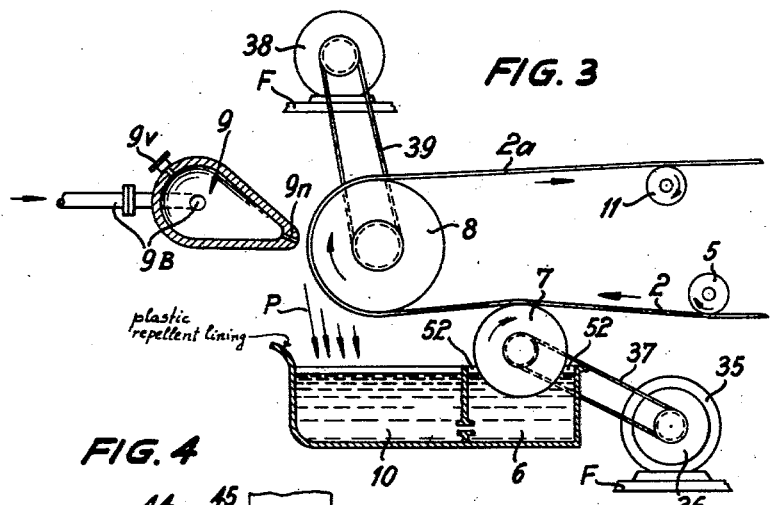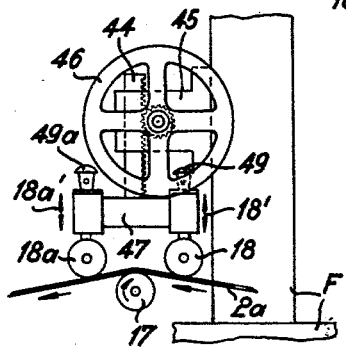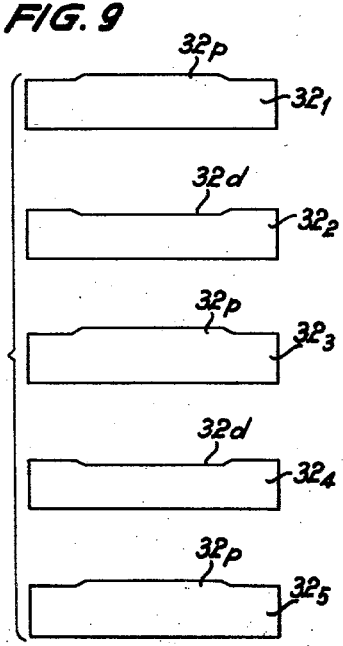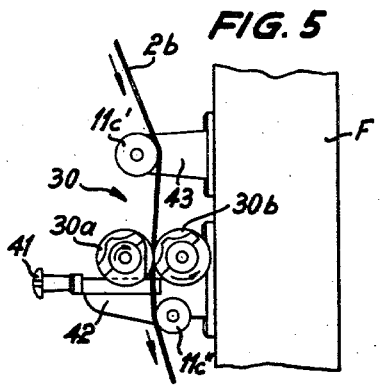

July 20, 1965 W. SCHOCH ETAL 3,196,038
PROCESS AND APPARATUS FOR THE PRODUCTION
OF COATED PAPER AND THE LIKE
Filed Oct. 12, 1960 3 Sheets-Sheet 3
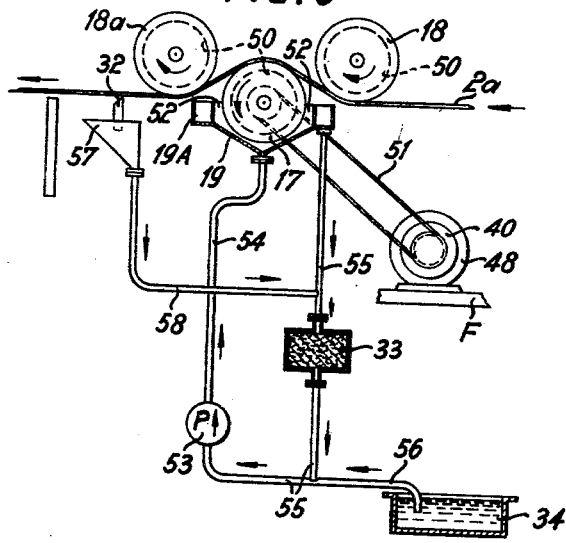
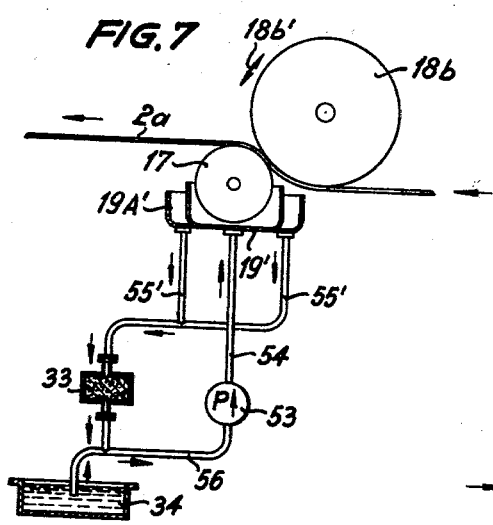
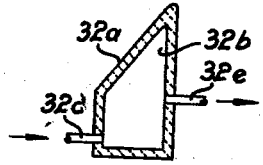
INVENTORS
Walter SCHOCH, HansGeorg DEUTSCHER
Siegfried HIRSCH, Heinz WEISS.
By
Michael S. Striker
their ATTORNEY

United States Patent Office 3,196,038
Patented July 20, 1965

3,196,038
PROCESS AND APPARATUS FOR THE PRODUCTION OF COATED PAPER AND THE LIKE
Walter Schoch, Mannheim, Waldhof, Hans G. Deutscher, Bielefeld, Siegfried Hirsch, Karlsruhe-Durlach, and Heinz Weiss, Mannheim, Germany, assignors to Zellstoff-Fabrik Waldhof, Mannheim-Waldhof, Germany
Filed Oct. 12, 1960, Ser. No. 62,166
Claims priority, application Germany, Dec. 15, 1959, Z 7,721
16 Claims. (Cl. 117—68)

The present invention relates to a process and to an apparatus for the production of coated webs consisting of paper, board and like flexible carrier material. More particularly, the invention relates to a process and to an apparatus for continuous production of coated paper of the type whose coating consists of a large number of superimposed layers which may be applied to one or both sides of the basic material.

An important object of the invention is to provide an improved process for the production of coated paper, board and like flexible material according to which a large number of coats may be applied to one or both sides of the starting material in a continuous uninterrupted operation.

Another object of the invention is to provide a process of the just outlined characteristics according to which a paper like material may be coated with three or more coats of different thicknesses and or different consistencies in a continuous operation, and which renders it possible to apply a large number of coats within very short periods of time.

A further object of the invention is to provide a process for the production of a coated paper like material which is impervious to grease, which is highly resistant to crimping and buckling, which is moisture proof, or which exhibits several of these characteristics after the completion of a single continuous coating operation.

An additional object of the invention is to provide an improved apparatus for carrying out the above process.

A concomitant object of the invention is to provide an improved apparatus for the production of coated paper like materials which occupies little space, which may be utilized for the application of a very large number of coats, which may be readily adapted for the production of coated materials of widely different characteristics, and which requires little attention by the operators once the coating process is started.

A more specific object of the invention is to provide an apparatus of the above outlined characteristics which is particularly suited for the application of a large number of coats to all types of paper like material, wherein the thickness of coats applied to the travelling web of paper may be varied as desired, and wherein the fully coated product may be reduced in size immediately after the completion of the last coating step.

A further object of the present invention is to provide a coated paper like product which exhibits very satisfactory resistance to the penetration of moisture, vapors, gases, steam or grease, which is of very satisfactory flexibility, which resists crimping or cracking, which is free of pores, and which may be produced in a continuous operation at a very low cost.

With the above objects in view, the invention resides in the provision of a process for the production of a coated paper like material which comprises essentially the steps of continuously moving a web of paper, board or like flexible carrier material in a predetermined and preferably meandering path, applying to the travelling web a comparatively thick first or base coat consisting of a suitable coating dispersion, equalizing the thickness of this base coat, preferably by subjecting the base coat to the action of controlled blasts of air or another gaseous medium, at least partially drying the base coat while the web continues its advance in its predetermined path, applying to the base coat at least one but preferably a series of comparatively thin and preferably softer intermediate adhesive coats and at least partially drying each intermediate coat immediately before the application of the next intermediate coat, the drying of intermediate coats being carried out by subjecting the same to the heating action of infrared lamps or like heat producing instrumentalities, applying to the travelling web a preferably somewhat harder top coat which is applied over the outermost intermediate coat and is thereupon equalized preferably by subjecting the top coat to the action of blasts of a gaseous medium, e.g. air, and drying the top coat before cutting and/or collecting the web on one or more takeup rolls or the like. The consistency of the top coat is preferably such that it will not adhere to the coated or uncoated side of the web, i.e. the top coat must be free of blocking.

It is preferred to arrange the aforementioned predetermined path in such a way that the coats are always applied to the underside of the travelling web and, if the nature of the operation is such that both sides of the web receive at least one coat, the web with the base coat applied thereto is deflected to change the direction of its advance, i.e. that the base coat is at the upper side of the web, whereupon a first coat may be applied to the uncoated underside of the web. When the application of the first coat to the uncoated side is completed, the web again reverses the direction of its travel to receive the aforementioned intermediate coats and the top coat at its initially coated side, and is thereupon again deflected in the opposite direction so that the once-coated second side may receive a second coat while this second side constitutes the underside of the travelling web. In other words, the web travels in a zig-zag path which preferably comprises at least four zones or laps in the lowermost of which a first side of the web receives the base coat, in the second of which the second side of the web receives the base coat, in the third of which the first side receives a plurality of intermediate coats and the top coat, and in the fourth of which the second side may receive one or more additional coats.

The improved apparatus for carrying out the above outlined process comprises essentially a source of paper or like flexible carrier material, means defining the aforementioned predetermined path for the web of material which is continuously paid out by said source, a first coating station for the application of a base coat to one side of the continuously advancing web, this first station preferably comprising at least one coating roll which dips into a suitable supply trough containing a coating composition, such as a dispersion selected from the group consisting of polyvinyl chloride, polyvinyl acetate, polyvinylidene chloride, esters of polyacrylic acid, polystyrol, polyethylene, paraffine and mixtures thereof, and a so-called air brush which equalizes the thickness of the top coat, a second coating station which is preferably of the same construction as the above described first coating station and which applies to the already coated side of the web a somewhat harder final or top coat, a plurality of preferably closely adjacent intermediate coating stations which are disposed between the aforementioned first and second stations, and suitable heating and/or drying stations disposed past each coating station, as seen in the direction in which the web advances. The coating stations at which the other side of the web receives one or more coats may be of the same design as the aforementioned coating stations. In certain instances, it is considered sufficient if the apparatus comprises a first coating station which includes an equalizing arrangement in the form of an air brush, and a series of closely adjacent additional stations without air brushes at which a series of comparatively thin and flexible coats is applied to the base coat.

Since it is normally preferred to apply the comparatively thin intermediate coats to the underside of the advancing web of paper like flexible material, and since is is also preferred to apply the base coat at the underside of the web, the web is usually deflected twice between the first coating station and the first intermediate coating station. Each intermediate coating station may comprise a coating roll which dips into a supply trough containing the dispersion and which engages the underside of the web, and two counterrollers which engage the upper side of the web at the opposite sides of the respective coating roll. The coating rolls at the intermediate coating stations rotate in the direction in which the web advances and at least the first thereof simultaneously serves as a component of the means for tensioning the web between the first coating station and the first intermediate coating station. It is preferred to provide means for adjusting the rotational speed of the coating rolls and eventually of the counterrollers. Since the intermediate stations are normally located rather close to each other, the coating rolls and the counterrollers at these stations may simultaneously serve as a means for guiding the web, i.e. no additional guide rolls are necessary between the first and the last intermediate coating stations.

The counterrollers are provided with means for moving the same toward and away from the web to thereby vary the tension of the web in addition to or instead of such adjustments in the tension which may be brought about by changes in rotational speed of the coating rolls at the intermediate coating stations. These coating rolls rotate at a peripheral speed which preferably should not exceed the forward speed of the web. It will be readily understood that very fine adjustments in the thickness of intermediate coats may be brought about by changing the rotational speed of the respective coating rolls and/or the pressure of the counterrollers.

A further feature of our invention resides in the provision of special precision equalizing arrangements at one, two or all intermediate coating stations to insure that the thickness of each intermediate coat remains uniform or that the thickness will vary only within the permissible range. For example, the precision equalizing arrangement may comprise a pressing roller which urges the web against the periphery of the respective coating roll with a controllable force to thereby determine the thickness of the intermediate coat. Alternately, the precision equalizing arrangement may comprise a series of doctor blades made of glass and mounted rearwardly of the respective intermediate coating stations so that their edge portions engage the freshly coated side of the web. The blades may be continuously cooled with air or another fluid, and their edge portions may be provided with complementary projections and depressions to thereby prevent streaking of the intermediate coats.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a schematic side elevational view of an apparatus for continuous application of several coats to a travelling web of paper like material in accordance with the process of the present invention;

FIG. 2 is an enlarged transverse section through the web as it appears after a single passage through the apparatus of FIG. 1;

FIG. 3 is an enlarged partly elevational and partly sectional view of the first coating station;

FIG. 4 is an enlarged elevational view of the adjusting means for the counterrollers at one of the intermediate coating stations;

FIG. 5 is an enlarged schematic view of the web cutting or splitting station;

FIG. 6 illustrates a precision equalizing and recirculating arrangement at an intermediate coating station;

FIG. 7 illustrates a slightly modified equalizing and recirculating arrangement;

FIG. 8 is an enlarged transverse section through an internally cooled doctor blade; and FIG. 9 illustrates five slightly modified doctor blades which are constructed with a view to prevent streaking of coats applied at the intermediate coating stations.

Referring now in greater detail to the drawings, and first to FIG. 1, there is shown a coating apparatus A which comprises a frame F including a journal 1a for a source in the form of a roll 1 of a paper to be coated. The travelling web 2 of uncoated paper which is continuously paid out by the roll 1 may consist of one or more layers of paper or of a lining paper, i.e. a paper having a backing consisting of aluminum foil or a synthetic plastic material. The web 2 is drawn in a direction to the right by a pair of draw rolls including a smaller-diameter roll 3 and a larger-diameter roll 4. Before reaching the draw roll 3, the web 2 passes beneath two spaced guide rolls 11a.

After leaving the draw roll 4, the web 2 respectively passes about and beneath a pair of guide rolls 5, the first of these guide rolls deflecting the web in a direction to the left and toward a first coating station I. This station I comprises a supply trough 6 which contains a first coating solution, i.e. a dispersion of a suitable material selected from the group mentioned above, and a driven first coating roll 7 which dips into the coating solution contained in the supply trough 6 and which is in contact with the underside of the travelling web 2. The first coating roll 7 is driven in clockwise direction, i.e. in a direction counter to the advance of the web 2. As shown in FIG. 3, the means for rotating the roll 7 comprises an electric motor 35 which is mounted in the apparatus frame F and drives a variable speed transmission 36, the latter in turn driving the coating roll 7 through a belt and pulley arrangement 37. The once-coated web 2a then passes about the periphery of a deflecting roll 8 in such a manner that its coated and still wet side does not come into contact with this roll, and is deflected by the roll 8 in a direction to the right, as viewed in FIG. 1, to pass over a series of guide rolls 11. The roll 8 is rotated in clockwise direction by an electric motor 38 and a belt and pulley arrangement 39 (see FIG. 3). While travelling about the periphtry of the deflecting roll 8, the coated side of the once-coated web 2a is subjected to the action of an air brush 9. This brush serves as a means for equalizing the thickness of the base coat consisting of the dispersion applied by the roll 7 and, as shown in FIG. 3, preferably consists of a pointed container connected by conduit means 9B to a source 9A (see FIG. 1) of compressed air, such as an air compressor, a blower or a pump. The container is formed with at least one slot defining a nozzle 9n and extending transversely of the web 2a so as to blow a single blast or several blasts of compressed air against the coated side of the web 2a while the latter passes about the deflecting roll 8. Alternately, the coat equalizing air brush 9 may comprise a nozzle defining a series of air discharge ports arranged in one or more rows at right angles to the longitudinal direction of the web 2a. The exact construction of this air brush, excepting its cooperation with the first coating station I, forms no part of the present invention. As indicated by the arrows P in FIG. 3, the plastic dispersion removed by the air brush 9 from the once-coated web 2a is accumulated in a collecting trough 10 which may be placed in immediate proximity of the supply trough 6. In fact, and as shown in FIG. 3, the troughs 6, 10 may form a unit which comprises an apertured partition through which the dispersion contained in the trough 6 communicates with the dispersion in the trough 10. The air brush 9 is equipped with a relief valve 9v of any known design.

As clearly shown in FIG. 1, the web 2a travels above the guide rolls 11 with its coated side turned in upward direction and hence out of contact with these rolls to pass beneath a series of spaced infrared heating elements or lamps 12 and thereupon beneath a drying station 13. This drying station 13 may comprise a series of fans or blowers, not shown in detail, or a series of conventional heating elements of any known design. After leaving the drying station 13, the once-coated web 2a is permitted to cool while advancing in a direction to the right, as viewed in FIG. 1, to thereupon pass about a deflecting roll 14 and to be deflected by this roll in upward direction toward a system of deflecting rolls 15, 16, the latter causing the web 2a to completely reverse the direction of its advance and to again move in a direction to the left. It will be noted that the path of the web 2a from the deflecting roll 8 to the deflecting roll 14 occurs in a substantially horizontal plane.

While advancing from the deflecting rolls 15, 16 in a direction to the left, the web 2a has it once-coated and at least partially dried side turned in downward direction and passes through a series of additional or intermediate coating stations $20_1$, $20_2$, $20_3$, $20_4$, $20_5$ in that order. Each of these intermediate stations $20_1$–$20_5$ comprises a supply trough 19, a driven coating roll 17 which dips into the solution or dispersion contained in the respective supply trough 19 and is in contact with the already coated underside of the web 2a, and two counterrollers 18, 18a disposed at opposite sides of the respective coating roll 17. The coating rolls 17 at the stations $20_1$–$20_5$ apply comparatively thin and rather soft films or layers of coating composition to the coated side of the web 2a, and each of these coating rolls 17 is preferably driven in anticlockwise direction, i.e. in the same direction in which the web 2a advances away from the deflecting rolls 15, 16. It is preferred to select the diameters of the coating rolls 17 and the dimensions of the troughs 19 in such a way (see FIGS. 6 and 7) that only a very small gap 52 develops between the longitudinal side walls of each trough 19 and the periphery of the respective roll 17. It is further preferred to utilize adjustable driving means 40, 48, 51, shown in FIG. 6, for the coating rolls 17 so that the rotational speed of these rolls may be varied within a desired range. Furthermore, the counterrollers 18, 18a at each of the coating stations $20_1$–$20_5$ are preferably adjustable in directions perpendicular to the plane of the web 2a (see the double arrows 18′, 18a′) to allow for adjustments in the tension of the paper within a range which is required for proper operation of the coating apparatus A and which in part depends on the nature of the coated web. The adjusting means for the counterrollers 18, 18a are shown in FIG. 4.

It will be noted that the median portion of the predetermined path of the web 2a, i.e. the portion between the rolls 16 and 5a, requires no guide rolls because the rolls at the intermediate coating stations $20_1$–$20_5$ simultaneously serve as a means for guiding and advancing the travelling web 2a in a direction toward the coating station II.

The rotational speed of one or more coating rolls 17, but at least of the rightmost roll 17 at the staion $20_1$, must be selected by full consideration of the nature of the dispersions contained in the respective supply troughs 19 and also with a view to obtain coats of desired thickness. The tension of the web 2a will also depend to a given extent on the nature of the dispersions in the troughs 19 at the stations $20_1$–$20_5$. Thus, the rotational speed of the coating rolls 17 must be selected with a view to control the tension of the web 2a; this rotational speed either equals or is less than the forward speed of the travelling web 2a. The speed of coating rolls 17 may be varied by transmissions 40 one of which is shown in FIG. 6. If required, the apparatus A may comprise one or more equalizing devices after each of the coating stations $20_1$–$20_5$, and each such equalizing device may comprise one or more smoothing rollers, spiral rollers or the like. Since the coats applied at the intermediate stations $20_1$–$20_5$ are comparatively thin, no air brushes are normally required past each of these stations.

After each of the coating stations $20_1$–$20_5$, there is provided a series of infrared heating elements 21 followed by drying stations 22. The provision of infrared heating elements 21 and of drying stations 22 is optional and depends on the nature and thickness of the dispersions applied at the intermediate stations $20_1$–$20_5$.

After advancing beyond the drying station 22 located rearwardly of the last group of heating elements 21, the web 2b, whose underside now carries one thick base coat 2a′ (station I) and five comparatively thin intermediate coats (stations $20_1$–$20_5$) forming a coat 2b′, reaches a further coating station II which is identical with the station I in that it comprises a supply trough 6a, a coating roll 7a which dips into the trough 6a and contacts the underside of the web 2b to apply thereto a top coat, a deflecting roll 8a which causes the web to move in a direction to the right, as viewed in FIG. 1, and an air brush 9a which equalizes the seventh layer applied to the underside of the web, the dispersion applied by the coating roll 7a and partly removed or blown off by the air brush 9a being accumulated in the collecting trough 10a. Before reaching the coating roll 7a, the web 2b passes about a guide roll 5a. The roll 7a is driven in clockwise direction, i.e. counter to the advance of the web 2b. It will be noted that the air brush 9a is connected to the source 9A by a conduit 9C which branches from the conduit 9B leading to the air brush 9.

The seven-times coated web 2c advancing beyond the roll 8a passes beneath a heating station comprising a series of infrared lamps 21a and thereupon beneath a drying station 22a. While advancing to the right of the deflecting roll 8a, the web 2c passes over a series of spaced guide rolls 11b. It will be noted that the coated side of the web 2c is turned in upward direction so as to be fully exposed to the action of infrared lamps 21a and to a drying action at the station 22a. In addition, the coated side cannot come into contact with the guide rolls 11b. The drying station 22a may be followed by a second heating station including a series of infrared heating elements 23 which are shown in immediate proximity of a cooling drum 24, the latter constituting a conventional component part of the improved coating apparatus A. Rearwardly adjacent to the cooling drum 24, there is provided an air conditioning station 25 of known design. While advancing past the cooling drum 24 toward, through, and beyond the air conditioning station 25, the web 2c passes partly about, above or beneath a series of guiding and deflecting rolls 11c to reach a cutting or slicing station 30, best shown in FIG. 5, where it is cut into strips of requisite width which are thereupon collected by a takeup or storage reel 26 mounted on a journal 26a forming part of the apparatus frame. As shown in FIG. 5, the cutting station 30 comprises at least two driven rollers 30a, 30b at least one of which carries one or more rotary cutters as is well known in the art. The cutting roller 30a may be adjusted in a direction toward or away from the cutting roller 30b by a manually operable spindle 41 which is rotatable in a bracket 42 carried by the apparatus frame F. This bracket 42 also supports the roller 30b and the guide roll 11c″ which directs the longitudinally cut web 2c toward the takeup reel 26. The guide roll 11c′ directs the web 2c into the gap between the cutting rollers 30a, 30b and is shown in FIG. 5 as mounted on a separate bracket 43. The means for driving the rollers 30a, 30b (e.g. an electric motor similar to the motor 35 or 38 of FIG. 3) is not shown in the drawings.

As shown in FIG. 2, the travelling web 2 paid out by the source 1 on the journal 1a receives a first or base coat 2a′ at the first coating station I to form the web 2a, whereupon the web 2a receives a composite second or intermediate coat 2b' to form the web 2b, and the web 2b receives a further or top coat 2c' to form the final product or web 2c. The composite coat 2b' consists of five comparatively thin layers applied to the base coat 2a' of the web 2a at the intermediate stations $20_1$–$20_5$.

Referring back to FIGURE 1, there is shown a further coating station 27 which is utilized for the application of a base coat to the uncoated underside 28 of the web 2a as the latter advances from the deflecting roll 8 toward the deflecting roll 14. This coating station 27 is preferably provided past the drying station 13. The station 27 may be constructed in a manner similar to the construction of the stations I and II, or in a manner corresponding to that of the intermediate stations $20_1$–$20_5$, depending on the nature and thickness of the coat applied to the underside 28. For example, the coating roll at the station 27 may apply a material similar to the material applied at the station I.

Furthermore, the apparatus A may comprise an additional coating station 29 which is preferably located rearwardly of the drying station 22a, in advance of the heating elements 23, and beneath the underside of the web 2c, i.e. adjacent to the side 28 which was once coated at the station 27.

As a further modification, the apparatus A may comprise one or more smoothing or calendering stations each including two or more rollers of known design. For example, a first calendering station 31 may be provided in advance or past the deflecting roll 14 to smooth the dried base coat or coats 2a' applied at the station I and/or 27, and a similar calendering station may be provided between the heating elements 23 and the cooling drum 24. Of course, the spacing between the heating elements 23 and the drum 24 is then greater than shown in FIGURE 1.

An important advantage of the improved apparatus A is that a large number of intermediate coating stations may be provided between the first coating station I and the last coating station II without unduly increasing the dimensions of the apparatus. This is due to the fact that the coats applied at the intermediate stations $20_1$–$20_5$ are comparatively thin, i.e. preferably weighing no more than 5 g./m.² and, therefore, these intermediate coats may be readily and rapidly dried while the web 2a advances to the closely adjacent next intermediate coating stations $20_2$, $20_3$, $20_4$, or $20_5$, or to the coating station II. Furthermore, since the intermediate stations $20_1$–$20_5$ are rather closely adjacent to each other, the coats applied at these stations need not come into contact with any guide rolls because the web 2a is properly guided by the coating rolls 17 and by the counterrollers 18, 18a. The intensity of heat supplied by the heating means 21 and the drying action at the stations 22 are selected in such a way that the first intermediate coat applied to the web 2a at the station $20_1$ is dried satisfactorily before the web reaches the coating roll 17 at the second intermediate station $20_2$. Consequently, the coating rolls 17 may apply to the web 2a coats consisting of a soft and even strongly adhesive material without the danger that the soft and sticky intermediate coats would adhere to guide rolls as in the coating apparatus of conventional design, and without affecting the homogeneousness of the intermediate layers. However, the coat 2c' applied at the coating station II is preferably hard enough to insure that the web 2c will not block, i.e. that the coat 2c' will not adhere to a similar coat when the web 2c is doubled over itself so that portions of its coat 2c' come into actual contact with each other.

As can be observed in FIGURE 1, the web 2b embodying the composite intermediate coat 2b' need not come into contact with a guide roll before reaching the coating roll 7a at the station II. Thus, and in contrast to certain coating systems of conventional design, the apparatus A may be constructed in such a way that no block-free coats must be applied over the comparatively soft and rather sticky intermediate coat 2b' in advance of the last coating station.

Another important advantage of the improved process and apparatus is that the web 2 may carry at its side 28 a coat of a plastic or like material before it reaches the first coating station I and particularly before it reaches the first intermediate coating station (see the position of the coating station 27 which is located between the station I and the first intermediate station $20_1$). The coat applied to the side 28 of the web 2 or 2a may consist of a liquid- and vapor-resistant layer of synthetic plastic material, of a metallic foil, or the like. Since the intermediate coating rolls 17 apply comparatively thin coats of a dispersion which is immediately heated and at least partially dried at the stations 21 and 22, the moisture contained in the plastic material applied by the rolls 17 cannot penetrate deeply into the material of the web 2a so that the danger of peeling of the coat applied to the side 28 is effectively prevented. In other words, the penetration of moisture into the web 2a at the intermediate stations $20_1$–$20_5$ is negligible.

The provision of the coating station 27 between the first coating station I and the first intermediate station $20_1$ also represents a very advantageous feature of the improved apparatus. The spacing of the deflecting roll 14 and of the station $20_1$ from the station I is considered necessary to insure proper drying of the coat 2a' at the stations 12, 13, and also to insure that all intermediate stations $20_1$–$20_5$ may be aligned with each other without requiring a deflection of the web 2a between the station $20_1$ and the station II. Therefore, it can be said that the coating station 27 for the underside 28 of the web 2a occupies space which must be provided in the apparatus A for other reasons, i.e. that the addition of the station 27 need not in any way contribute to a greater length of the apparatus. This holds equally true even if the nature of the coat applied at the station 27 is such that this coat must be heated and dried and/or calendered before the side 28 of the web 2a reaches and comes into contact with the deflecting roll 15. As can be observed in FIG. 1, the station 29 is also provided along a stretch of the web 2c which is necessary to insure satisfactory drying of the top coat 2c'. It will be readily understood that considerable savings in time, machinery and personnel may be achieved by using the apparatus A wherein one or both sides of the web may be coated with a large number of layers while the web travels only once through the apparatus. The application of pore-free multi-layer coats to one and/or both sides of a web is not possible with the apparatus of presently known design.

Referring now to FIG. 4, the means for simultaneously moving the counterrollers 18, 18a in the directions respectively indicated by the arrows 18' and 18a' comprises a toothed rack 44 which is mounted for vertical movement in a bracket or support 45 carried by the apparatus frame F. The rack 44 may be reciprocated by a pinion which is coaxial with a handwheel 46, the latter rotatably mounted in the support 45. The counterrollers 18, 18a are mounted at the longitudinal ends of a horizontal beam 47 provided at the lower end of the rack 44 and engage the upper side of the web 2a at the opposite sides of the coating roll 17 which is driven in anticlockwise direction by an electric motor 48 shown in FIG. 6.

Very fine adjustments in the vertical position of the counterrollers 18, 18a may be brought about by two threaded spindles 49, 49a, respectively, which are mounted in the beam 47 and mesh with suitable gears (not shown) coaxially secured to the shafts of the counterrollers 18, 18a. Thus, the arrangement shown in FIG. 4 allows for simultaneous as well as for individual adjustment of the counterrollers 18, 18a so that the tension of the web 2a and hence the thickness of the intermediate coat applied by the roll 17 may be controlled with very great accuracy. The friction between the upper side of the web 2a and the peripheries of the counterrollers 18, 18a may be varied by coating these counterrollers with suitable layers of a material having a desired coefficient of friction.

In certain instances, it is desirable to apply the intermediate coats at the stations $20_1$–$20_5$ with utmost accuracy. It has been found that intermediate coats of uniform thickness cannot always be obtained merely by controlling the rotational speed of the coating rolls 17 and/or the position of the counterrollers 18, 18a. This is due to slight fluctuations in the tension of the web 2a as the latter travels through the intermediate coating stations $20_1$–$20_5$. Even the provision of calendering rolls, spiral rollers and certain other known equalizing devices cannot insure complete uniformity in the thickness of the intermediate layers.

In accordance with the present invention, there is provided a novel precision equalizing arrangement, shown in FIG. 6, which insures that the thickness of all intermediate coats (which together form the composite coat 2b') may remain uniform even if the tension of the travelling web 2a should vary within a rather wide range. Such precise equalization may be obtained by subjecting each intermediate coat to the action of a doctor blade 32 which is mounted rearwardly of the respective coating roll 17, as viewed in the direction in which the web 2a advances, and especially good results have been obtained if the doctor blades 32 consist of glass or a like refractory material. We have found that the equalizing action of doctor blades 32 may be improved still further if these blades are cooled with air or with any other suitable fluid, for example, in the manner shown in FIG. 8. Thus, the hollow blade 32a which may also consist of a metallic or a synthetic plastic material, defines therewithin a cavity 32b communicating with a supply pipe 32c and with a discharge pipe 32e. The pipe 32c may be connected to the pressure side of the compressor 9A shown in FIG. 1, and the pipe 32e may discharge spent gas to the atmosphere.

Still better results can be obtained if all elements coming into actual contact with the web 2a at the intermediate coating stations $20_1$–$20_5$ are cooled by air or by another fluid medium. This is indicated somewhat schematically in FIG. 6 wherein the coating roll 17 and the counterrollers 18, 18a are formed with internal cooling chambers 50 each of which may be connected with the compressor 9A or with a separate compressor in the same manner as described in connection with FIGS. 3 and 8. Of course, it is often sufficient if only one or if only certain of the web-contacting elements 17, 18, 18a and 32 are cooled at the intermediate stations.

The improved equalizing action of cooled web-contacting elements can be explained in the following manner: It has been found that the formation of small coagulated particles in the dispersion will effect the uniformity of intermediate coats applied by the coating rolls 17. The coagulation of the coating dispersion can be prevented by cooling the dispersion during the application of an intermediate coat to the web 2a.

Referring again to FIG. 6, it will be seen that the coating roll 17 is driven by a belt and pulley drive 51 which is operated by a variable speed transmission 40. The latter is operatively connected with the aforementioned electric motor 48 which is mounted on the frame F of the apparatus A. As explained hereinabove, the roll 17 is preferably driven at a peripheral speed which does not exceed the forward speed of the web 2a. In the illustrated embodiment, the roll 17 rotates anticlockwise because the web advances in a direction from the right to the left, as viewed in FIGS. 1 and 6.

According to another feature of our invention, the dispersion in the supply troughs 19 for the coating rolls 17 is controlled in such a way that its surface exposed to the atmosphere is of very small area. This also contributes to the uniformity in the thickness of intermediate coats applied at the stations $20_1$–$20_5$ because it has been found that a skin will develop on the exposed surface of the dispersion in the troughs 19 and that such skin will adversely affect the uniformity of the coats applied by the rolls 17. The formation of coagulated skin layers on the exposed surface of the dispersion in the troughs 19 may be prevented by reducing the area of the exposed surface and also by continuously recirculating the dispersion in the supply troughs. As shown in FIG. 6, the opening in the top of the supply trough 19 is selected in such a way that only two narrow gaps 52 are formed between the longitudinal side walls of the supply trough and the periphery of the coating roll 17. Such configuration of the supply trough and such mounting of the coating roll reduces the exposed surface of the dispersion to a minimum so that no skin can develop on the dispersion and the formation of coagulated layers or particles is effectively prevented especially because the dispersion is preferably subjected to a continuous recirculating action by a pressure source shown in FIG. 6 as a pump 53.

The supply trough 19 is preferably surrounded by a collecting trough or container 19A, and the pump 53 delivers to the trough 19 such quantities of a dispersion that the dispersion overflows at a high speed over the longitudinal side walls of the trough 19 and into the container 19A, i.e. the pump 53 delivers to the trough 19 per each unit of time a quantity of suitable dispersion which is greater than the quantity applied by the coating roll 17 to the underside of the web 2a per same unit of time.

The recirculating system further comprises a supply conduit 54 which connects the pressure side of the pump 53 with the preferably conical bottom zone of the supply trough 19, a return conduit 55 which connects the container 19A with the suction side of the pump 53 and which preferably contains a suitable sieve or filter 33, and a source of dispersion in the form of a reservoir 34 which is connected with the return conduit 55 by a further conduit 56.

The dispersion removed from the web 2a by the equalizing doctor blade 32 is collected in a container 57 and is delivered to the filter 33 by a conduit 58. The filter 33 removes from the dispersion all coagulated particles and other contaminants so that the pump 53 receives a uniform dispersion which is entirely free of coagulated matter. It will be readily understood that the supply trough 19 and the collecting container 19A may be provided with suitable cooling jackets or the like.

In accordance with another feature of our invention, the walls of the troughs 6, 10, 6a, 10a, 19, 19A and 57 are lined with layers of a material which repels the dispersion in these troughs, i.e. which will not permit the deposition of continuously growing layers of coagulated material. For example, the lining of dispersion-repelling material may be made of silicon. This is of particular importance in the supply troughs 6, 6a and 19 because, and as shown in FIGS. 3 and 6, the gaps 52 between their longitudinal side walls and the peripheries, of the respective coating rolls are so narrow that any deposition of coagulated material on these side walls would interfere with the overflow of the dispersion into the respective collecting containers. Though not shown in FIG. 3, it will be readily understood that the trough 6 may be combined with a collecting container similar to the container 19A shown in FIG. 6, or that the trough 10 may form a collecting container for the dispersion which overflows from the trough 6. The nature and the composition of the dispersion-repelling lining on the walls of the various troughs and containers will depend on the composition of the dispersion utilized at the respective coating station. It has been found that, if the walls of the troughs containing the dispersion are not provided with a dispersion-repelling lining (indicated by way of example by a legend in FIG. 3), the layers of coagulated material deposited on the walls will grow into actual contact with the peripheries of the coating rolls and will be transferred to the web 2a to affect the uniformity of intermediate coats.

FIG. 7 illustrates a slightly different precision equalizing arrangement which may be utilized at each of the intermediate coating stations $20_1$–$20_5$. Thus, the coating roll 17 may be combined with a pressing roller 18b which engages the opposite (upper) side of the web 2a and presses the same against the periphery of the roll 17 with a controllable force necessary for the formation of an intermediate coat of requisite thickness. The pressing roller 18b is adjustable in the directions indicated by the double arrow 18b' by a system (not shown) which may include a rack-and-pinion drive and a handwheel of the type illustrated in FIG. 4.

The recirculating arrangement of FIG. 7 differs only slightly from the recirculating arrangement shown in FIG. 6. A slightly modified supply trough 19' is surrounded by a collecting container 19A' which is provided with two spaced outlets connected to return conduits 55' for delivering the overflowing dispersion to a filter or sieve 33 and thence to a conduit 56 leading from a reservoir 34 and to the suction side of a pump 53. A supply conduit 54 connects the pressure side of the pump 53 with the bottom zone of the supply trough 19'.

It will be readily understood that the pressing roller 18b may be installed in the equalizing arrangement of FIG. 6 and/or FIG. 4, i.e. that each intermediate coating station may include a pair of adjustable counter-rollers, 18, 18a and/or a pressing roller 18b and/or a doctor blade 32 or 32a.

Referring finally to FIG. 9, there is shown a further equalizing arrangement which is especially useful for the prevention of streaks which often develop in the intermediate coats applied at the stations $20_1$–$20_5$. The five doctor blades $32_1$–$32_5$ shown in FIG. 9 are respectively provided at the intermediate stations $20_1$–$20_5$ in the same order. Quite surprisingly, the streaking of intermediate coats may be prevented in a very simple manner if the successively arranged doctor blades $32_1$–$32_5$ or at least two of these blades are formed with edge portions which are profiled in such a way that one thereof is formed with a projection 32p while the next one is formed with a complementary depression 32d. The peripheral projection 32p of the blade $32_1$ at the station $20_1$ removes from the first intermediate coat a somewhat thicker layer while the next blade $32_2$ allows the application of a somewhat thicker second intermediate coat at the station $20_2$ because it is formed with a depression 32d. The excess material removed by the projection 32p of the blade $32_3$ is substituted for by the material permitted to pass through the depression 32d of the blade $32_4$, and the projection 32p of the last blade $32_5$ removes excess material permitted to remain on the web 2a as the latter advances past the last coating roll 17.

The slightly elevated zones of intermediate coats allowed to remain on the underside of the web 2a as the latter passes along the blades $32_2$ and $32_4$ are thus removed by the blades $32_3$ and $32_5$ so that the composite coat 2b' is again one of uniform thickness as if the intermediate stations were equipped with a precision equalizing arrangement of the type shown in FIGS. 4, 6, or 7. However, while some streaking of intermediate coats could be observed from time to time in the arrangement of FIGS. 4, 6, and 7, the equalizing system of FIG. 9 effectively prevents such streaking at all times.

It will be readily understood that, if the apparatus A is not equipped with doctor blades $32_1$–$32_5$, the coating rolls 17 at the stations $20_1$–$20_5$ may be formed with peripheral projections and depressions in a manner analogous to that shown in FIG. 9.

*Example I*

The web 2 consisted of a bleached paper obtained by the soda process with a specific weight of 60 g./m.² At the first coating station I, this web received a base coat 2a' consisting of a dispersed material and with a weight of 10 g./m.² At the intermediate coating stations $20_1$–$20_5$, the once-coated paper web 2a received five additional coats each with a weight of 3 g./m.² and each consisting of a dispersion. The intermediate coat 2b' applied at the stations $20_1$–$20_5$ was comparatively soft and flexible, and its additional purpose was to improve the density of the paper web 2b. At the coating station II, the web 2b received an additional or top coat 2c' consisting of a dispersion with a weight of 5 g./m.² The purpose of the top coat 2c' applied at the station II was to produce a film which was so hard after drying at the station 22a as to be free of blocking. The composite coat or layer 2a', 2b', 2c' with a weight of 30 g./m.² provided a film of great flexibility and free of pores which, by proper selection of the coating dispersion, exhibited a very satisfactory resistance to penetration of gases, water vapors and steam.

The base coat 2a' was formed by the application of a dispersion selected from the group consisting of polyvinyl chloride, polyvinyl acetate, polyvinylidene chloride, esters of polyacrylic acid, polystyrol, polyethylene, paraffine, as well as mixtures of these substances.

The composite coat 2b' was formed by utilizing dispersions of the same substance or substances as at the station I. However, it is preferred to utilize such dispersions which will produce a comparatively soft and highly flexible intermediate coat 2b'. The softer the dispersions used at the stations $20_1$–$20_5$, the more flexible is the intermediate coat 2b'. A somewhat harder dispersion was used at the station II. For example, the hardness of dispersions used at the stations I and II may be the same, and the dispersion used at the station II must produce a coat 2c' which is free of blocking. As is well known in the art, the softness or hardness of the dispersion may be controlled by controlling the polymerization of the starting material or materials. Many such dispersions with varying degrees of softness are available on the market, and any further degree of softness or hardness may be attained by mixing dispersions of the same substances but of different softness, or by mixing dispersions of different substances.

*Example II*

The web 2 consisted of a bleached cellulose paper with a specific weight of 40 g./m.² one side of which was connected with an aluminum foil by means of a suitable adhesive. The exposed side of the paper web 2 was led through the apparatus A to receive a base coat 2a' at the station I. This base coat 2a' consisted of an aqueous dispersion of the type mentioned in Example I with a weight of only 5–7 g./m.², and the dispersion was thereupon carefully dried in a manner as described in connection with FIG. 1. Five additional coats of a similar but preferably softer aqueous dispersion were applied to the coat 2a' at the stations $20_1$–$20_5$, and each such additional coat was comparatively thin, i.e. with a weight of up to 3 g./m.² At the last coating station II, the composite layer 2a', 2b' consisting of six coats applied at the stations I and $20_1$–$20_5$ received a comparatively thick top coat 2c' of a similar but block-free dispersion with a weight of about 15 g./m.² The final product consisting of an aluminum foil, of cellulose paper and of seven coats applied to the exposed side of the cellulose paper was found to constitute a very satisfactory wrapping material the coated side of which was free of pores and exhibited great resistance to the penetration of gases, water vapors and steam, and the other side of which presented the neat aluminum foil enhancing the appearance of the final product. Of course, the absence of pores and the resistance to penetration of vapors depend on the nature of the material applied at the various coating stations.

*Example III*

The web consisted of a satinized paper with a specific weight of about 60 g./m.² At the station I, this paper was coated with an aqueous dispersion of a mixed polymerizate of vinylidene chloride, and the base coat 2a' was thereupon equalized with the air brush 9 in the manner as described in connection with FIG. 1. The mixed polymerizate utilized at the station I was obtained by the polymerization of vinylidene chloride with other polymerizable components, for example, esters of acrylic acid (particularly acrylic acid methyl- and acrylic acid butyl esters), vinyl chloride and acrylonitrile. The weight of the first coat $2a'$ in fully dried condition was about 15 g./m.$^2$.

At the stations $20_1$–$20_5$, the base coat $2a'$ received five additional coats each consisting of a 50 percent aqueous dispersion of polyacrylate. After each of the intermediate stations $20_1$–$20_5$, the newly applied coat was equalized with the help of a doctor blade 32 made of glass (see FIG. 6) so that the adhesive coats constituting the composite intermediate coat $2b'$ were of uniform thickness and, after drying, each of these coats weighed about 1 g./m.$^2$. The dispersion at the stations $20_1$–$20_5$ was applied in the following manner: Two-thirds of the coating solution applied at each of these stations remained on the travelling web $2a$ while one-third overflowed from the supply trough 19 into the collecting container $19a$. Each doctor blade 32 thereupon removed one-half of the coating solution which still adhered to the web $2a$ so that only one-third of the solution supplied to the troughs 19 at the stations $20_1$–$20_5$ actually remained on the original coat $2a'$. The arrangement was such that, in order to achieve satisfactory economy, the solution removed by the doctor blades 32 was passed through suitable sieves or filters 33 and was thereupon returned to the respective supply troughs 19. As stated above, the solution overflowing from the supply troughs 19 was collected in the collecting troughs 19A during the application of solution to the travelling web $2a$. After passing the respective doctor blades 32, the web $32a$ was dried with high-intensity infrared heaters at the stations 21.

As is known, the polyacrylate coat is rather sticky and, therefore, the last step consisted in the application of a comparatively thick top coat $2c'$ which was of satisfactory hardness and therefore free of blocking. At the station II, the web $2b$ reecived a polyvinylidene chloride top coat $2c'$ of the same consistency as that which constituted the coat $2a'$ and with a weight of about 10 g/m.$^2$. The finial product was found to be highly resistant to buckling or cracking, and its resistance to penetration by steam, gases and water vapors was extremely high, that is, the penetration of vapors was well below the normally measurable value of 1 g./m.$^2$ per 24 hours.

*Example IV*

The starting material consisted of a board with a specific weight of about 120 g./m$^2$. At the station I, this material received a base coat $2a'$ consisting of a 50-percent aqueous dispersion of polyvinyl chloride which was free of softening agents. The weight of this first coat $2a'$ was about 20 g./m.$^2$ (calculated after drying), and the coat $2a'$ was immediately equalized by the air brush 9 in the manner as shown in FIGS. 1 and 3. At the intermediate stations $20_1$–$20_5$, the coat $2a'$ received very thin coats each with a weight of only about ½ g./m.$^2$ and each consisting of a polyacrylate of very high viscosity which was attained by adding to the polyacrylate a mixture of ammonia and polyacrylic acid. The combined coating and guide rolls 17 at the intermediate stations $20_2$–$20_5$ consisted of steel, and each of these intermediate stations further included one or more counterrollers 18, $18a$ and/or $18b$ consisting of rubber or of a material with a peripheral liner of a plastic-repellent substance, such as silicon or the like.

Alternately, the supply troughs 19 at the last two intermediate stations $20_4$ and $20_5$ contained only a dispersion of pure polyacrylate which improves the sealing characteristics of the web. The top coat $2c'$ formed at the station II was applied in the same manner as in the Example III. For example, this last coat may consist of dispersed polyvinyl acetate. The final product exhibited very satisfactory characteristics as regards the imperviousness to grease and the resistance to buckling and cracking. It was useful as a wrapper for foodstuffs and for the wrapping of technical equipment.

*Example V*

The web 2 consisted of a bleached paper with a specific weight of about 100 g./m$^2$. At the station I, the web 2 received a base coat $2a'$ consisting of a 50-percent aqueous dispersion of polyvinyl acetate, and the weight of this first coat was about 10 g./m$^2$. The web $2a$ thereupon passed along the nozzle or nozzles $9n$ of the air brush 9 on its way to the intermediate stations $20_2$–$20_5$. At each of these intermediate stations, the base boat $2a'$ received a further coat, each with a weight of about 2 g./m.$^2$ (in dried condition) and each consisting of a 50 percent aqueous dispersion of polyacrylate. The procedure was the same as in the Example IV. After each of four adjacent intermediate coating stations, there was provided a cooled metallic doctor blade $32a$ serving as an equalizing means, and each successive blade $32a$ at the stations $20_1$–$20_5$ was formed with staggered profiled zones, e.g. of the type shown in FIG. 9. The top coat $2c'$ applied at the station II consisted of a 50-percent aqueous dispersion of polyvinylidene chloride with a weight of about 5 g./m.$^2$ (in dried condition). The final product was characterized by extremely high pliability and was capable of withstanding repeated bending stresses such as will take place in certain rapidly driven bolting mills and the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for the production of coated paper, board and like flexible material which comprises advancing a web of flexible carrier material in a predetermined path; applying to one side of the web a dispersion selected from the group consisting of polyvinyl chloride, polyvinyl acetate, polyvinylidene chloride, esters of polyacrylic acid, polystyrene, polyethylene, paraffin and mixtures of such substances to form a base coat; equalizing the thickness of the base coat by subjecting the top face of the base coat to the action of an air doctor and drying the thus equalized base coat, said equalizing and drying being carried out without contacting the surface of said base coat with any mechanical equalizing or drying means; applying to the base coat at least one softer intermediate coat whose thickness is less than the thickness of the base coat by covering the base coat with a dispersion selected from the group consisting of polyvinyl chloride, polyvinyl acetate, polyvinylidene chloride, esters of polyacrylic acid, polystyrene, polyethylene, paraffin and mixtures of such substances; drying the web after the application of the intermediate coat; applying to the intermediate coat a dispersion selected from the group consisting of polyvinyl chloride, polyvinyl acetate, polyvinylidene chloride, esters of polyacrylic acid, polystyrene, polyethylene, paraffin and mixtures of such substances to form a top coat whose thickness at least equals the thickness of the intermediate coat and which is harder than said intermediate coat; and equalizing the thickness of the top coat by subjecting the top face of the top coat to the action of an air doctor and drying the thus equalized top coat, said equalizing and drying being carried out without contacting the surface of said top coat with any mechanical equalizing or drying means.

2. A process for the production of coated paper, board and like flexible material in a single operation, said process comprising the steps of advancing a web of flexible carrier material in a meandering path from a lower level to a higher level; applying to the underside of the web a dispersion selected from the group consisting of polyvinyl chloride, polyvinyl acetate, polyvinylidene chloride, esters of polyacrylic acid, polystyrene, polyethylene, paraffin and mixtures of such substances while the web advances in the proximity of the lower zone of said path to form a base coat with a weight of 5–20 g./m.$^2$ when in dried condition; equalizing the thickness of the base coat by subjecting the top face of the base coat to the action of an air doctor and drying the thus equalized base coat, said equalizing and drying being carried out without contacting the surface of said base coat with any mechanical equalizing or drying means; successively applying to the base coat a series of intermediate softer coats with a weight of 0.5–5 g./m.$^2$ when in dried condition, said intermediate coats, respectively, being thinner than said base coat, by covering said base coat with successive layers of a dispersion selected from the group consisting of polyvinyl chloride, polyvinyl acetate, polyvinylidene chloride, esters of polyacrylic acid, polystyrene, polyethylene, paraffin and mixtures of such substances while the web advances in such zone of said path that said base coat is located at the underside thereof; drying the web after each application of an intermediate coat; applying to the outermost intermediate coat a dispersion selected from the group consisting of polyvinyl chloride, polyvinyl acetate, polyvinylidene chloride, esters of polyacrylic acid, polystyrene, polyethylene, paraffin and mixtures of such substances to form a top coat with a weight of 5–15 g./m.$^2$ when in dried condition which is harder than said intermediate coat, while the web advances in such zone of said path that said coats are located at the underside thereof; and equalizing the thickness of the top coat by subjecting the top face of the top coat to the action of an air doctor and drying the thus equalized top coat, said equalizing and drying being carried out without contacting the surface of said top coat with any mechanical equalizing or drying means.

3. A process for the production of coated paper, board and like flexible material in a single operation, said process comprising the steps of continuously advancing a web of flexible carrier material in a meandering path from a lower level to a higher level; applying to the underside of the web a dispersion selected from the group consisting of polyvinyl chloride, polyvinyl acetate, polyvinylidene chloride, esters of polyacrylic acid, polystyrene, polyethylene, paraffin and mixtures of such substances while the web advances in the proximity of the lower zone of said path, to form at the underside of the web a base coat with a weight of 5–20 g./m.$^2$ when in dried condition; equalizing the thickness of the base coat by subjecting the top face of the base coat to the action of an air doctor and drying the thus equalized base coat, said equalizing and drying being carried out without contacting the surface of said base coat with any mechanical equalizing or drying means; successively applying to the base coat a series of softer intermediate coats with a weight of 0.5–5 g./m.$^2$ when in dried condition by covering the base coat with successive layers of a viscous dispersion selected from the group consisting of polyvinyl chloride, polyvinyl acetate, polyvinylidene chloride, esters of polyacrylic acid, polystyrene, polyethylene, paraffin and mixtures of such substances through the medium of spaced coating rolls while the web advances in such zone of said path that the base coat is located at the underside thereof and simultaneously driving the coating rolls in a direction in which the web advances in said path; regulating the rotational speed of the coating rolls to thereby control the tension of said web; drying the web after each application of an intermediate coat; applying to the outermost intermediate coat a dispersion selected from the group consisting of polyvinyl chloride, polyvinyl acetate, polyvinylidene chloride, esters of polyacrylic acid, polystyrene, polyethylene, paraffin and mixtures of such substances to form a top coat with a weight of 5–15 g./m.$^2$ when in dried condition which is harder than said intermediate coat while the web advances in such zone of said path that said coats are located at the underside thereof; and equalizing the thickness of the top coat by subjecting the top face of the top coat to the action of an air doctor and drying the thus equalized top coat, said equalizing and drying being carried out without contacting the surface of said top coat with any mechanical equalizing or drying means.

4. In a process for the production of coated paper, board and like flexible material, the steps of continuously advancing a web of flexible carrier material in a predetermined path; applying to the underside of the web a dispersion selected from the group consisting of polyvinyl chloride, polyvinyl acetate, polyvinylidene chloride, esters of polyacrylic acid, polystyrene, polyethylene, paraffin and mixtures of such substances to form a hard base coat with a weight of 5–20 g./m.$^2$ when in dried condition; equalizing the thickness of the base coat by subjecting the top face of the base coat to the action of an air doctor and drying the thus equalized base coat, said equalizing and drying being carried out without contacting the surface of said base coat with any mechanical equalizing or drying means; successively applying to the base coat at least two softer intermediate coats with a weight of 0.5–5 g./m.$^2$ when in dried condition by covering the base coat, while the base coat is located at the underside of said web, with layers of a dispersion selected from the group consisting of polyvinyl chloride, polyvinyl acetate, polyvinylidene chloride, esters of polyacrylic acid, polystyrene, polyethylene, paraffin and mixtures of such substances; precision equalizing the thickness of each intermediate coat; drying each intermediate coat; applying to the outermost intermediate coat a dispersion selected from the group consisting of polyvinyl chloride, polyvinyl acetate, polyvinyl chloride, esters of polyacrylic acid, polystyrene, polyethylene, paraffin and mixtures of such substances to form a top coat the thickness of which at least equals the thickness of the intermediate coat and which is harder than said intermediate coat; and equalizing the thickness of the top coat by subjecting the top face of the top coat to the action of an air doctor and drying the thus equalized top coat, said equalizing and drying being carried out without contacting the surface of said top coat with any mechanical equalizing or drying means.

5. In a process for the production of coated paper, board and like flexible material, the steps of advancing a web of flexible carrier material in a predetermined path; applying at a first coating station to one side of the web a dispersion selected from the group consisting of polyvinyl chloride, polyvinyl acetate, polyvinylidene chloride, esters of polyacrylic acid, polystyrene, polyethylene, paraffin and mixtures of such to form a base coat; equalizing the thickness of the base coat by subjecting the top face of the base coat to the action of an air doctor and drying the thus equalized base coat, said equalizing and drying being carried out without contacting the surface of said base coat with any mechanical equalizing or drying means; providing at least two intermediate coating stations by placing in the path of the web at least two coating rolls and by providing for each coating roll a supply trough for a dispersion selected from the group consisting of polyvinyl chloride, polyvinyl acetate, polyvinylidene chloride, esters of polyacrylic acid, polystyrene, polyethylene, paraffin and mixtures of such substances, with the dispersions continuously overflowing from the respective supply troughs; successively contacting the base coat with the coating rolls to apply thereto softer intermediate coats whose thickness at most equals the thickness of the base coat; drying each intermediate coat; applying to the outermost intermediate coat a dispersion selected from the group consisting of polyvinyl chloride, polyvinyl acetate, polyvinylidene chloride, esters of polyacrylic acid, polystyrene, polyethylene, paraffin and mixtures of such substances to form a top coat the thickness of which at least equals the thickness of the intermediate coat and which is harder than said intermediate coat; and equalizing the thickness of the top coat by subjecting the top face of the top coat to the action of an air doctor and drying the thus equalized top coat, said equalizing and drying being carried out without contacting the surface of said top coat with any mechanical equalizing or drying means.

6. A process for the production of a vapor and steam resistant coated paper in a single operation which comprises the steps of continuously advancing a web of bleached paper obtained by the soda process and with a weight of about 60 g./m.$^2$ in a predetermined path; applying to one side of the web a coating solution consisting of a dispersion selected from the group consisting of polyvinyl chloride, polyvinyl acetate, polyvinylidene chloride, esters of polyacrylic acid, polystyrene, polyethylene, paraffin and mixtures of such substances to form a base coat; equalizing the thickness of the base coat by subjecting the top face of the base coat to the action of an air doctor to obtain a base coat with a weight of about 10 g./m.$^2$ when in dried condition, and drying the thus equalized base coat, said equalizing and drying being carried out without contacting the surface of said base coat with any mechanical equalizing or drying means; successively applying to the base coat a series of intermediate coats by covering the base coat with successive layers of a comparatively soft dispersion selected from the group consisting of polyvinyl chloride, polyvinyl acetate, polyvinylidene chloride, esters of polyacrylic acid, polystyrene, polyethylene, paraffin and mixtures of such substances, of such thickness that each intermediate coat has a weight of about 3 g./m.$^2$ when in dried condition; drying the web after each application of an intermediate coat; applying to the outermost intermediate coat a dispersion selected from the group consisting of polyvinyl chloride, polyvinyl acetate, polyvinylidene chloride, esters of polyacrylic acid, polystyrene, polyethylene, paraffin and mixtures of such substances, to form a top coat which is harder than said intermediate coats; and equalizing the thickness of the top coat by subjecting the top coat to the action of an air doctor to obtain a top coat with a weight of about 5 g./m.$^2$ when in dried condition and drying the thus equalized top coat, said equalizing and drying being carried out without contacting the surface of the top coat with any mechanical equalizing or drying means.

7. A process for the production of a vapor and steam resistant coated wrapping paper in a single operation which comprises the steps of continuously advancing a web of bleached cellulose paper with a specific weight of about 40 g./m.$^2$ one side of which is laminated with an aluminum foil in a predetermined path; applying to the other side of the web an aqueous dispersion selected from the group consisting of polyvinyl chloride, polyvinyl acetate, polyvinylidene chloride, esters of polyacrylic acid, polystyrene, polyethylene, paraffin and mixtures of such substances to form thereon a base coat; equalizing the thickness of the base coat by subjecting the top face of the base coat to the action of an air doctor to obtain a base coat with a weight of between about 5–7 g./m.$^2$ when in dried condition and drying the thus equalized base coat, said equalizing and drying being carried out without contacting the surface of said base coat with any mechanical equalizing or drying means; successively applying to the base coat a series of softer intermediate coats by covering the base coat with successive layers of said aqueous dispersion of such thickness that each intermediate coat has a weight of up to about 3 g./m.$^2$ when in dried condition; drying the web after each application of an intermediate coat; applying to the outermost intermediate coat a block-free aqueous dispersion selected from the group consisting of polyvinyl chloride, polyvinyl acetate, polyvinylidene chloride, esters of polyacrylic acid; polystyrene, polyethylene, paraffin and mixtures of such substances, to form a harder top coat; equalizing the thickness of the top coat by subjecting the top face of the top coat to the action of an air doctor to obtain a top coat with a weight of about 15 g./m.$^2$ when in dried condition and drying the thus equalized top coat, said equalizing and drying being carried out without contacting the surface of said top coat with any mechanical equalizing or drying means.

8. A process for the production of a vapor and steam resistant coated paper which is free of buckling and cracking, said process comprising the steps of continuously advancing a web of satinized paper with a specific weight of about 60 g./m.$^2$ in a predetermined path; applying to one side of said web an aqueous dispersion of a mixed polymerizate of vinylidene chloride, to form thereon a base coat; equalizing the thickness of the base coat by subjecting the top face of the base coat to the action of an air doctor to obtain a base coat with a weight of about 15 g./m.$^2$ when in dried condition and drying the thus equalized base coat while the web advances in said path, said equalizing and drying being carried out without contacting the surface of said base coat with any mechanical equalizing or drying means; successively applying to the base coat a series of softer intermediate coats by covering the base coat with successive layers of a 50-percent aqueous dispersion of polyacrylate; equalizing the thickness of each successively applied intermediate coat to obtain intermediate coats with a thickness of about 1 g./m.$^2$ when in dried condition; drying the web and the coats after each application of an intermediate coat; applying to the outermost intermediate coat an aqueous dispersion of polyvinylidene chloride to form a harder top coat; equalizing the thickness of the top coat slowly by subjecting the top face of the top coat to the action of an air doctor to obtain a top coat with a weight of about 10 g./m.$^2$ when in dried condition and drying the thus equalized top coat, said equalizing and drying being carried out without contacting the surface of said top coat with any mechanical equalizing or drying means.

9. A process for the production of a greaseproof coated wrapper which is free of buckling and cracking, said process comprising the steps of continuously advancing a web of a board with a specific weight of about 120 g./m.$^2$ in a predetermined path; applying to one side of the web a 50-percent aqueous dispersion of polyvinyl chloride free of softening agents to form a base coat; equalizing the thickness of the base coat by subjecting the top face of the same to the action of an air doctor to obtain a base coat with a weight of about 20 g./m.$^2$ when in dried condition and drying the thus equalized base coat, said equalizing and drying being carried out without contacting the surface of said base coat with any mechanical equalizing or drying means; successively applying to the base coat a series of softer intermediate coats by covering the base coat with a highly viscous dispersion of polyacrylate containing a mixture of ammonia and polyacrylic acid of such thickness that each intermediate coat has a weight of about ½ g./m.$^2$ when in dried condition; drying the web and the coats thereon after each application of an intermediate coat; applying to the outermost intermediate coat a dispersion of polyvinyl acetate to form a harder top coat; equalizing the thickness of the top coat slowly by subjecting the top face of the top coat to the action of an air doctor to obtain a top coat with a weight of about 5 g./m.$^2$ when in dried condition and drying the thus equalized top coat, said equalizing and drying being carried out without contacting the surface of said top coat with any mechanical equalizing or drying means.

10. A process for the production of a highly pliable coated paper in a single operation comprising the steps of continuously advancing a web of a bleached paper with a specific weight of about 100 g./m.$^2$ in a predetermined path; applying to one side of the web a 50-percent dispersion of polyvinyl acetate to form a base coat; equalizing the thickness of the base coat slowly by subjecting the top face of the base coat to the action of an air doctor to obtain a base coat with a weight of about 10 g./m.$^2$ when in dried condition and drying the thus equalized base coat, said equalizing and drying being carried out without contacting the surface of said base coat with any mechanical equalizing or drying means; successively applying to the base coat a series of softer intermediate coats by covering the base coat with a 50-percent aqueous dispersion of polyacrylate to obtain a series of intermediate coats each with a weight of about 2 g./m.$^2$ when in dried condition; drying the coats after each application of an intermediate coat; applying to the outermost intermediate coat a 50-percent aqueous dispersion of polyvinylidene chloride to form a harder top coat; equalizing the thickness of the top coat slowly by subjecting the top face of the same to an air doctor to obtain a top coat with a weight of about 5 g./m.$^2$ when in dried condition and drying the thus equalized top coat, said equalizing and drying being carried out without contacting the top surface of said top coat with any mechanical equalizing or drying means.

11. A process for the production of coated paper, board and like flexible material in a single uninterrupted operation as set forth in claim 1, wherein the web of flexible carrier material is advanced in a meandering path from a lower level to a higher level, wherein said base coat is formed at said lower level, wherein said base coat is equalized on the continuously advancing web while the web advances in a first zone above said lower level, wherein said intermediate coat is applied while the web advances in a second zone above said first zone, and wherein the top coat is dried while the web advances at said higher level.

12. A process for the production of coated paper, board and like flexible material in a single operation as set forth in claim 1, comprising the steps of successively applying to the base coat a series of intermediate coats of a thickness less than the thickness of said base coat by covering said base coat with successive layers of the respective dispersion while the web advances in an intermediate zone of said predetermined path, and drying the web after each application of an intermediate coat.

13. A process as set forth in claim 1, further comprising the steps of applying to the other side of the web at least one coat by covering the same with at least one layer of a dispersion selected from the group consisting of polyvinyl chloride, polyvinyl acetate, polyvinylidene chloride, esters of polyacrylic acid, polystyrene, polyethylene, paraffin and mixtures of such substances; and drying said last mentioned coat.

14. A process as set forth in claim 4, wherein said additional coats are equalized by contact with edge portions of cooled doctor blades.

15. A process as set forth in claim 5, further comprising the steps of recirculating the overflowing dispersions and continuously filtering the overflowing dispersions.

16. A process as set forth in claim 9, further comprising the steps of applying to the outermost intermediate coat at least one additional intermediate coat by covering the outermost intermediate coat with a layer of a dispersion of pure polyacrylate to obtain a coat with a weight of about ½ g./m.$^2$ when in dried condition, and drying the additional intermediate coat prior to the formation of said top coat.

References Cited by the Examiner

UNITED STATES PATENTS

| | | | |
|---|---|---|---|
| 343,387 | 6/86 | Newton | 118 |
| 981,383 | 1/11 | Comstock | 118 |
| 1,985,698 | 12/34 | Swan | 117—158 X |
| 2,081,320 | 5/37 | Burgess. | |
| 2,130,241 | 9/38 | MacLaurin | 118—63 X |
| 2,325,798 | 8/43 | Porter | 117—68 |
| 2,513,394 | 7/50 | Barrett et al. | 118—224 X |
| 2,776,236 | 1/57 | Staehle | 117—76 X |
| 2,874,407 | 2/59 | Chabot et al. | 118—101 X |
| 3,020,224 | 2/62 | Blanket et al. | 118—63 X |

RICHARD D. NEVIUS, *Primary Examiner.*

JOSEPH REBOLD, *Examiner.*